United States Patent
Welch, Sr. et al.

(10) Patent No.: US 8,215,810 B2
(45) Date of Patent: Jul. 10, 2012

(54) INTERIOR COMPONENTS HAVING ILLUMINATION FEATURES

(75) Inventors: Thomas A. Welch, Sr., Ortonville, MI (US); Paul S. Severinski, Brownstown, MI (US); Pusheng Chen, Novi, MI (US); Paula J. Bird, Huntsville, AL (US); Benedict J. Messina, Warren, MI (US); Bryan L. Orlando, Sterling Heights, MI (US)

(73) Assignee: Lear Corporation, Southfield, MI (US)

(*) Notice: Subject to any disclaimer, the term of this patent is extended or adjusted under 35 U.S.C. 154(b) by 105 days.

(21) Appl. No.: 12/681,205

(22) PCT Filed: Oct. 27, 2008

(86) PCT No.: PCT/US2008/081299
§ 371 (c)(1),
(2), (4) Date: Jul. 8, 2010

(87) PCT Pub. No.: WO2009/058723
PCT Pub. Date: May 7, 2009

(65) Prior Publication Data
US 2010/0296302 A1 Nov. 25, 2010

Related U.S. Application Data

(60) Provisional application No. 61/001,627, filed on Nov. 2, 2007, provisional application No. 61/128,769, filed on May 23, 2008.

(51) Int. Cl.
*B60Q 1/00* (2006.01)

(52) U.S. Cl. .......................... 362/488; 362/501; 362/511
(58) Field of Classification Search .................. 362/487, 362/488, 501, 511
See application file for complete search history.

(56) References Cited

U.S. PATENT DOCUMENTS

| 4,234,907 A | 11/1980 | Daniel |
| 5,611,089 A | 3/1997 | Cretors |
| 5,709,448 A * | 1/1998 | Jennings et al. .............. 362/581 |

(Continued)

FOREIGN PATENT DOCUMENTS

JP 11004733 A 1/1999

(Continued)

OTHER PUBLICATIONS

PCT/US2008/081299 International Search Report dated Jun. 25, 2009.

*Primary Examiner* — David V Bruce
(74) *Attorney, Agent, or Firm* — MacMillan, Sobanski & Todd, LLC (57) ABSTRACT

An interior component having an illuminated portion comprises a trim cover positioned over a substrate. At least one light conductive element is in communication with an illumination source. A carrier engages the trim cover. The carrier further secures the light conductive element to the trim cover. The carrier has a plurality of windows formed therethrough such that the light conductive element is visible through the plurality of windows. The illuminated portion may further include an emblem in communication with the light source. The illuminated interior component may be formed by a method that includes the steps of forming a light conductive element that includes extruding an optical guide and a carrier having a mounting tab thereon.

18 Claims, 5 Drawing Sheets

U.S. PATENT DOCUMENTS

| | | |
|---|---|---|
| 5,709,449 A | 1/1998 | Kuo |
| 5,813,148 A | 9/1998 | Guerra |
| 5,879,076 A | 3/1999 | Cross |
| 6,126,233 A | 10/2000 | Gaetano et al. |
| 6,302,570 B1 | 10/2001 | Petell et al. |
| 6,450,678 B1 * | 9/2002 | Bayersdorfer ............... 362/581 |
| 6,561,684 B2 | 5/2003 | Reitze et al. |
| 6,736,442 B2 * | 5/2004 | Gebreselassie et al. ...... 362/488 |
| 6,773,129 B2 | 8/2004 | Anderson, Jr. et al. |
| 6,854,869 B1 * | 2/2005 | Fernandez ................... 362/488 |
| 7,168,862 B2 | 1/2007 | Qi et al. |
| 7,258,469 B2 | 8/2007 | Manico et al. |
| 7,559,667 B2 | 7/2009 | Holderman |

FOREIGN PATENT DOCUMENTS

| | | |
|---|---|---|
| JP | 2002023676 A | 1/2002 |

\* cited by examiner

INTERIOR COMPONENTS HAVING ILLUMINATION FEATURES

CROSS-REFERENCE TO RELATED APPLICATIONS

This application claims the benefit of U.S. Provisional Application No. 61/001,627, filed Nov. 2, 2007, and U.S. Provisional Application No. 61/128,769, filed May 23, 2008, the disclosures of which are incorporated herein by reference.

BACKGROUND OF THE INVENTION

This invention relates in general to interior components, such as seats, door panels, and map pockets. This invention relates in particular to interior components having illuminated features.

Illumination of interior components for functional and aesthetic purposes is known in the art. For example, U.S. Pat. Nos. 6,854,869 and 6,450,678 disclose seats including an outer covering having an illuminated elongated light guide assembly attached thereto. In one instance, the light guide assembly includes an optical wave guide and a hollow carrier. In another instance, the light guide is a fiber optic bundle consisting of a plurality of filaments. The hollow carrier includes a cylindrical portion and two opposed, projecting legs that are separable therebetween. In order to insert the optical wave guide, the hollow carrier is laid open and the optical wave guide is positioned within the cylindrical portion. The projecting legs are brought together such that the cylindrical portion encircles the optical wave guide. The projecting legs of the hollow carrier are then bonded together at a single point to secure the optical wave guide therein and form the light guide assembly. The light guide assembly is stitched into a seam on the seat cover and connected to a source of light at one end for illuminating the light guide. The opposing end of the light guide assembly includes a reflector or optical coupler. The construction of such a light guide assembly requires additional processing steps which add expense and the potential for quality problems.

U.S. Pat. No. 4,234,907 discloses a light emitting fabric that includes fiber optic filaments that may be woven together. The filaments may be then interwoven with conventional yarns or threads to form a fabric. The fiber optic filaments are notched for lateral light transmission from the filaments. There is a light source at one end of the filaments and a reflective device at an opposed end. U.S. Pat. No. 5,709,448 discloses the woven fiber optic panel incorporated into a seat back pocket. While the interwoven filaments and thread may produce an illuminated effect, creating a patterned effect or providing localized light emission may result in customized woven fabrics for specific needs. As such, the flexibility to change existing designs may be more cumbersome.

Thus, it would be desirable to create an illuminated interior component that is inexpensive to produce, provides an aesthetic or functional localized light pattern, and increases flexibility of interior component design.

SUMMARY OF THE INVENTION

This invention relates to an interior component having an illuminated portion. The interior component includes a trim cover positioned over a substrate. A carrier engages the trim cover. The carrier includes at least one light conductive element that is in communication with an illumination source. The carrier further secures the light conductive element to the trim cover. The carrier has a plurality of windows formed therethrough such that the light conductive element is visible through the plurality of windows. The carrier may, in turn, be an emblem having an illuminated portion. The invention further relates to a method of extrusion forming portions of the carrier or the light conductive element.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
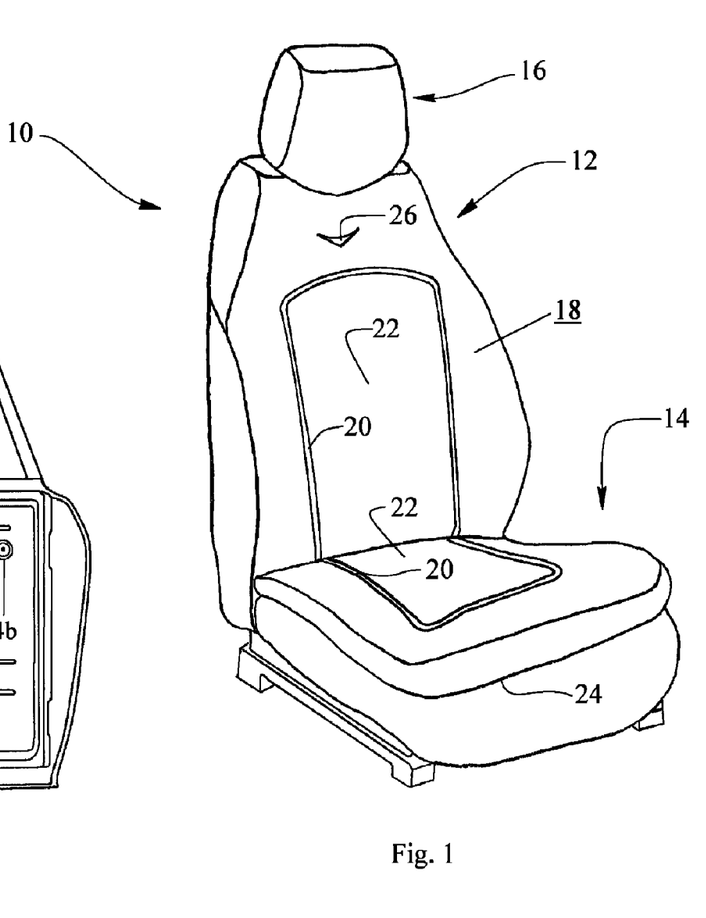
FIG. 1 is a perspective view of a vehicle seat having illuminated features mounted thereon in accordance with a first embodiment of the invention.

Referring now to the drawings, there is shown in FIG. 1 a vehicle seat 10 having a seat back 12, a seat bottom 14, and a headrest 16. The illustrated vehicle seat 10 is, in large measure, conventional in the art and is intended merely to illustrate one environment in which this invention may be used. Thus, the scope of the invention is not intended to be limited for use with the specific structure of the vehicle seat 10 illustrated in FIG. 1 or with seating systems in general. On the contrary, as will become apparent below, this invention may be used in any desired environment for the purposes described below.

The structure of the portions of the seat 10 can be of a known conventional nature such as made of a generally rigid framework with a substrate, such as foam cushions, attached thereto and an outer trim cover 18 covering the foam cushion. In a first embodiment of the invention, the seat back 12 and the seat bottom 14 each include a light conductive element, such as elongated strips 20 which may be illuminated from a source of light such as, for example, a light emitting diode (LED). When illuminated, the strips 20 provide an aesthetically pleasing appearance. The strips 20 may be formed of a transparent or translucent material, such as a polymer, that may be flexible in order to be easily routed along varying contours and to deflect with the surrounding component. Further, the strips 20 may have a coating or surface treatment on the outer surface thereof such that light is emitted therethrough and viewable by a person. The structure and method of forming such a strip 20 will be described in detail below.

In a preferred embodiment, the source of light can deliver different colors and intensities of light to the strips 20. A single light source may be connected at one end of the strips 20, though such is not required. A deflector or another light source may be provided at the other end. Light sources at both ends may be desirable due to the length of the strip 20. Where the strip 20 is substantial in length, loss of intensity of the emitting light may result as the distance from the source of light increases. Additionally, the second light source may provide light having a different color and intensity such that the combination of the two light sources is different from either single light source alone.

The strips 20 can be mounted, inlaid, sewed, or otherwise attached at any location on the seat 10. For example, in the illustrated embodiment in FIG. 1, the strips 20 may be attached at seams where the edges of two trim covers are attached together. More specifically, the seat back 12 and the seat bottom 14 each include a U-shaped strip 20 at the outer perimeter of a central portion 22 thereof. Alternatively, a perimeter strip 24, similar to the strip 20, may be positioned about the seat bottom 14. When so configured, the perimeter strip 24 may be electrically connected to the interior lighting system such that when the door is opened, the perimeter strip 24 illuminates the vehicle floor and door sill area to facilitate ingress and egress. When the door is closed, the perimeter strip 24 may turn off, change color, or operate at a reduced intensity. It should be understood, however, that the strip 20 and the perimeter strip 24 may be positioned anywhere in the vehicle interior and for any purpose. For example, when illuminated, the strip 20 could also be used to indicate a condition of the seat 10 or the vehicle. In order to indicate the temperature state of the seat 10, the strips 20 could emit a reddish color indicating that seat heaters are on or a bluish hue indicating the seat cooling system is operating.

The seat 10 may also include an emblem 26 attached thereto, such as on an upper central portion of the seat back 12. Alternatively, the emblem 26 may be positioned on the headrest 16 or on any other portion of an interior component if desired. Similar to the strip 20, the emblem 26 may be made of a transparent or translucent material and illuminated by a source of light as will be described below. If desired, the same source of light may direct light to both the strips 20 and the emblem 26. Alternatively, multiple lights sources may be used. The type of light emitted by the light sources may be the same for the strips 20 and emblem 26 or the light may be different for the strips 20 and the emblem 26.

Figure 2:
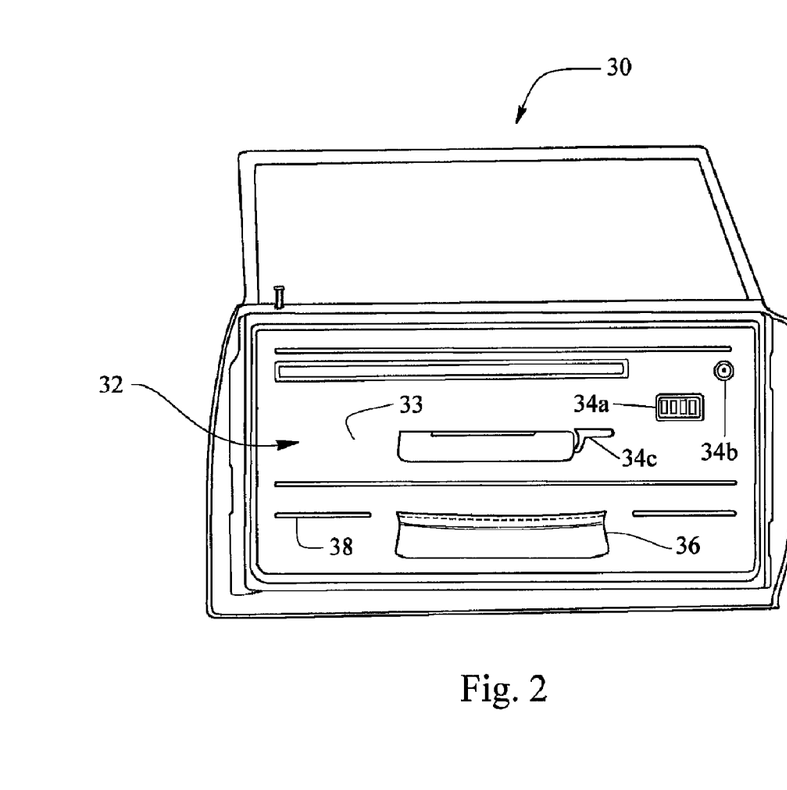
FIG. 2 is an elevational view of a door having an panel including illuminated features mounted thereon in accordance with a second embodiment of the invention.

Referring now to FIG. 2, there is illustrated a door 30 having an interior panel 32 attached thereto in accordance with a second embodiment of the invention. Though shown attached to the door 30, the interior panel 32 may be attached to any portion of the vehicle interior. The interior panel 32 may be covered by a trim cover 33, similar to the trim cover 18 of the seat 10 described above, that is positioned over a substrate. The interior panel 32 may include at least one control switch for operating a portion of the door 30 such as, for example, a window switch 34a, a side view mirror switch 34b, and a door latch release 34c, if so desired. The interior panel 32 may further include an illuminated pocket 36 and a courtesy light bar 38 thereon, if desired. The structure of the illuminated pocket 36 will be described below. The courtesy light bar 38 may include a portion of the strip 20 in an embodiment of the invention. However, any embodiment of the strips described herein may be used if so desired. The courtesy light bar 38 may also be connected to the interior lighting system such that when the door 30 is opened, the courtesy light bar 38 illuminates. The courtesy light bar 38 may be aimed to illuminate a portion of the exterior of the vehicle and the ground to facilitate ingress and egress. When the door 30 is closed, the courtesy light bar 38 may turn off, change color, or operate at a reduced intensity.

Figures 3, 4, 6, 7:
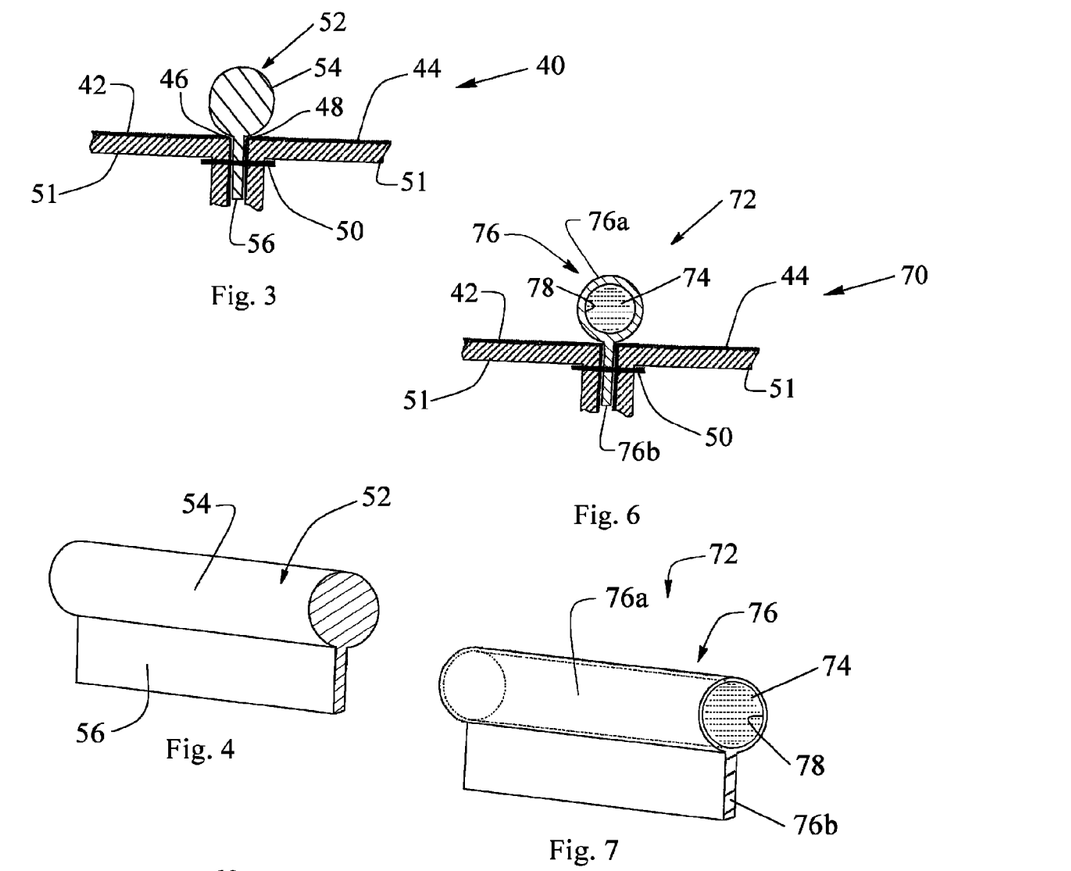
FIG. 3 is a schematic, cross-sectional view of a seam assembly having an illuminated strip in accordance with a third embodiment of the invention.
FIG. 4 is a perspective view, in cross-section, of a portion of the illuminated strip of FIG. 3.
FIG. 6 is a schematic, cross-sectional view of a seam assembly having an illuminated strip in accordance with a fourth embodiment of the invention.
FIG. 7 is a perspective view, in cross-section, of a portion of the illuminated strip of FIG. 6.

There is illustrated in FIGS. 3 and 4 a third embodiment of the invention that includes a seam assembly 40 for use with an interior component, such as the seat 10 or the door panel 32. The seam assembly 40 includes a pair of trim covers 42 and 44 having respective edges 46 and 48 that are attached together by a thread 50. Though illustrated and described as attached by a thread 50, the seam assembly 40 may be secured by any other suitable attachment structures if desired. The trim covers 42 and 44 can be made of any suitable material, such as cloth, vinyl, or leather and may further include a layer of cushion or foam material 51. The thread 50 also attaches an illuminated strip, shown generally at 52, to the pair of trim covers 42 and 44. The strip 52 is similar to the strip 20 discussed above and may be illuminated in a like manner if desired.

The strip 52 includes a main portion 54 and a retaining element, shown as a mounting tab 56, that extends outwardly, illustrated as a radially outward direction, from the main portion 54. In the embodiment shown, the main portion 54 has a generally cylindrical shape but can have any suitable shape desired. The strip 52 can extend from the joined edges 46 and 48 of the trim covers 42 and 44, as shown in FIG. 3. Alternatively, the strip 52 can be tucked into a channel (not shown) formed by one or both of the trim covers 42 and 44. The mounting tab 56 may be generally flat and dimensioned to be disposed between the adjoining trim covers 42 and 44 and secured with the thread 50. The main portion 54 and the mounting tab 56 are illustrated as an integrally formed structure and made of the same material. The strip 52 may be formed, for example, by extrusion to produce an elongated linear shape that may be cut to the desired length. Alternatively, the strip 52 may be made by injection molding or any other process that forms a contoured part of a fixed length, similar to the U-shaped strip 20 shown in FIG. 1.

Figure 5:
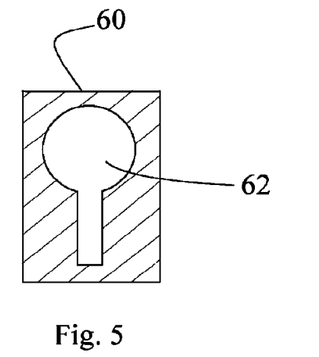
FIG. 5 is an elevation view, in cross-section, of an extrusion mold part that may be used to form the illuminated strip of FIG. 3.

There is illustrated in FIG. 5 an example of a molding part, such as an extrusion die 60, which may be used in the extrusion process. The extrusion die 60 includes an opening 62 generally corresponding to the cross-sectional shape of the strip 52. When material is extruded through the opening 62, the strip 52 is formed having the integrally formed main portion 54 and mounting tab 56.

As described above with respect to the strip 20, a light source is directed at the strip 52 such that at least the length of the main portion 54 of the strip 52 is illuminated. The outer surface of the main portion 54 may include a coating, a film, or have textured features provided thereon to facilitate the propagation of the light therethrough.

There is illustrated in FIG. 6 a seam assembly 70 in accordance with a fourth embodiment of the invention that may be used in the seat 10 or the door panel 30. The seam assembly 70 is similar in configuration and operation to the seam assembly 40. The seam assembly 70 includes a strip, shown generally at 72, in FIGS. 6 and 7. The strip 72 includes an optical guide 74 that is embedded into a retaining element, such as a carrier 76. The carrier 76 may include a guide retaining portion 76a having an opening 78 which receives the optical guide 74. The guide retaining portion 76a may have the same outer perimeter shape as the optical guide 74, though such is not required. The guide retaining portion 76a of the carrier 76 may encircle a portion of the optical guide 74 about the complete perimeter, though such is not required. The carrier 76 may further include a radially extending mounting tab 76b that is sewed or otherwise engaged with the trim covers 42 and 44. The optical guide 74 may have a light source (not shown) connected thereto, similar to that described above in conjunction with the strip 20. Light is transmitted by way of the optical guide 74 through the carrier 76, which is preferably made of a transparent or translucent material such as a clear resin. The optical guide 74 can be formed of multiple strands of optic fiber filaments or formed as a single-piece, fiber optic cable.

Figure 8:
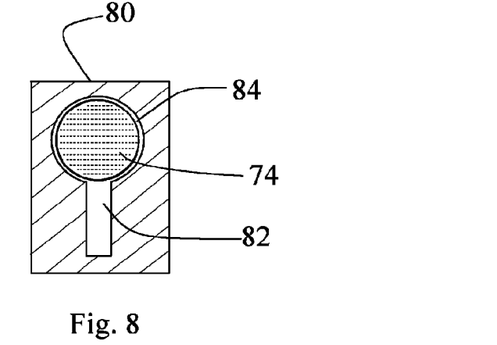
FIG. 8 is an elevation view, in cross-section, of an extrusion mold part that may be used to form the illuminated strip of FIG. 6.

The strip 72 can be manufactured by an extrusion process, such as a co-axial extrusion, where the carrier 76 is formed in the extrusion process and a previously manufactured optical guide 74 is simultaneously fed or inserted into a molding part 80. FIG. 8 illustrates the molding part 80 such as a coaxial extrusion or coaxial assembly die. The die is similar to the die 60 and includes an opening 82. The opening 82 is shaped to form the carrier 76 similar to the opening 62 to produce strip 52 as shown in FIGS. 4 and 5, if so desired. When the die 80 is arranged as a coaxial extrusion die, a portion of the opening 82 cooperates with the optical guide 74 positioned therein to form an annular wall section cavity 84. The carrier 76 may be introduced into the opening 82 as a raw material, such as a powder, a pelletized material, or a liquid material, which may also be heated. The raw material may coalesce or solidify within or at the exit of the die 80.

In an alternative arrangement, the optical guide 74 and the carrier 76 may be both formed in prior operations and then assembled together. In such an assembly process, the opening 78 of the carrier 76 may be formed slightly larger than the outer diameter of the optical guide 74. The carrier 76 may be made from a material that is dimensionally responsive to heat. When the die 80 is arranged as a co-axial assembly die, the carrier 76 and the optical guide 74 are both preformed and delivered to the die 80 in a solid condition. The carrier 76 and the optical guide 74 may be simultaneously introduced into the opening 82. The optical guide 74 may be a plurality of filaments arranged in a bundle or a singular fiber optic element. During the co-axial assembly process, the die 80 may be heated to cause the opening 78 to shrink onto the optical guide 74 for conformance therewith. In either arrangement, the carrier 76 is formed as a single piece structure substantially devoid of seams.

Figure 9:
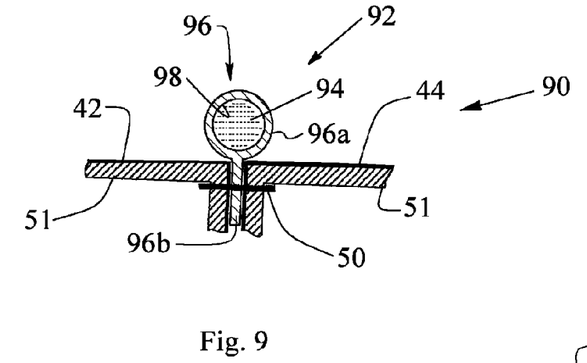
FIG. 9 is a schematic, cross-sectional view of a seam assembly having an illuminated strip in accordance with a fifth embodiment of the invention.
Figure 10:
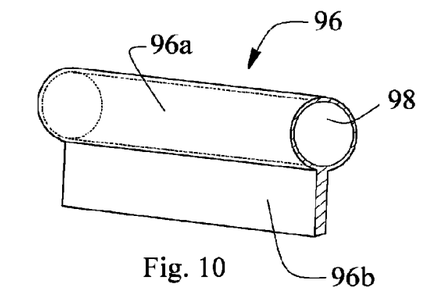
FIG. 10 is a perspective view, in cross-section, of a portion of the illuminated strip of FIG. 9.
Figure 11:
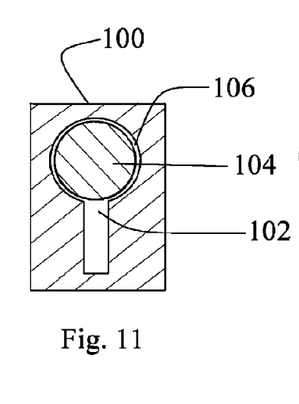
FIG. 11 is an elevation view, in cross-section, of an extrusion mold part that may be used to form the illuminated strip of FIG. 9.

Referring now to FIGS. 9-11, there is illustrated a seam assembly 90 as part of an interior component, such as the seat 10 or the door panel 32, that constitutes a fifth embodiment of the invention. The seam assembly 90 includes a strip 92 having an optical guide 94 and a carrier 96 having a guide retaining portion 96a and a mounting tab 96b. The guide retaining portion 96a includes an opening 98 that receives the optical guide 94 therein. The optical guide 94 has an outer diameter that is sized such that a slight radial clearance fit exists with the opening 98. The radial clearance allows the optical guide 94 to be slipped inside the carrier 96. The illustrated carrier 96 may be formed in an extrusion die 100 as shown in FIG. 11, though such is not required. The carrier 96 is formed as a single, seamless piece. The extrusion die 100 includes an opening 102 and a mandrel 104 positioned therein. The mandrel 104 and the opening 102 cooperate to create an annular cavity 106 that defines the guide retaining portion 96a including the opening 98. The optical guide 94 is inserted into the opening 98 in a slight clearance fit arrangement.

Figure 12:
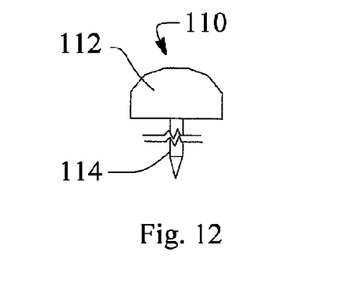
FIG. 12 is an end elevational view of an illuminated emblem that can be used with the seat of FIG. 1 in accordance with a sixth embodiment of the invention.
Figure 13:
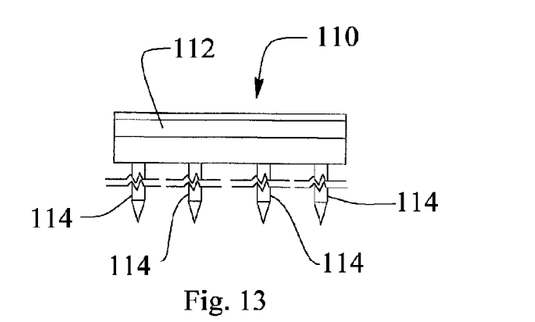
FIG. 13 is a side elevational view of the emblem of FIG. 12.
Figure 14:
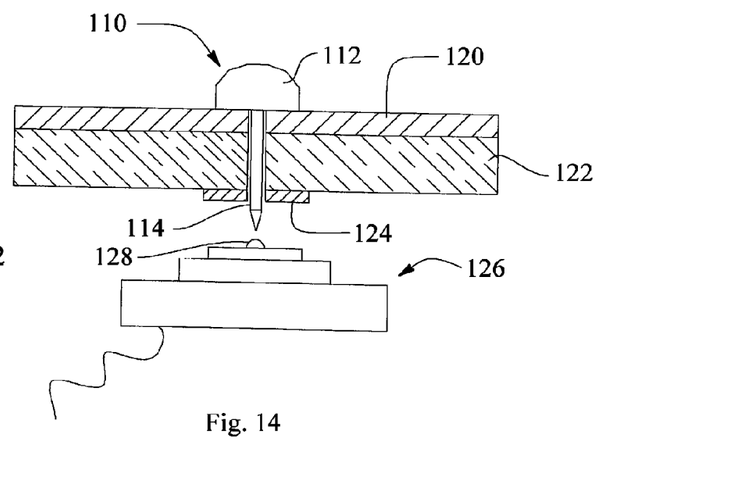
FIG. 14 is a schematic cross-sectional view of an emblem assembly using the emblem of FIG. 12.

FIGS. 12 through 14 schematically illustrate an illuminated emblem 110 that is a portion of a sixth embodiment of the invention. The illuminated emblem 110 may be used as the emblem 26 of FIG. 1 or in conjunction therewith. The emblem 110 is preferably made of a transparent or translucent material and includes a main body portion 112 and a light conductive element, such as at least one mounting stake 114 as shown in FIG. 12. Preferably, the emblem 110 may include more than one mounting stake 114, as shown in FIG. 13. The mounting stakes 114 can have any suitable length.

To install the emblem 110 onto an interior component, the mounting stakes 114 are inserted through a trim cover 120 and a substrate 122, such as a seat cushion or door bolster backing layer. The ends of the mounting stakes 114 are secured to a retaining element, such as a mounting plate 124, to secure the emblem 110 relative to the trim cover 120. The mounting stakes 114 can be attached to the mounting plate 124 by any suitable manner, such as for example by a snap fit or interference fit as shown in FIG. 14. In a preferred embodiment, the mounting stakes 114 are integrally formed with the main body portion 112 and are also made of a transparent or translucent material. A light source 126 may include a light 128, such as an LED light, incandescent light, fluorescent light, and the like, that directs light through the mounting stakes 114 to the main body portion 112. Additionally, the light source 126 may also direct light through openings, such as perforations formed in the trim cover 120, as will be described below. In this instance, the mounting plate 124 is also preferably made of a transparent or translucent material to facilitate the passage of light.

Figures 15A, 20, 21:
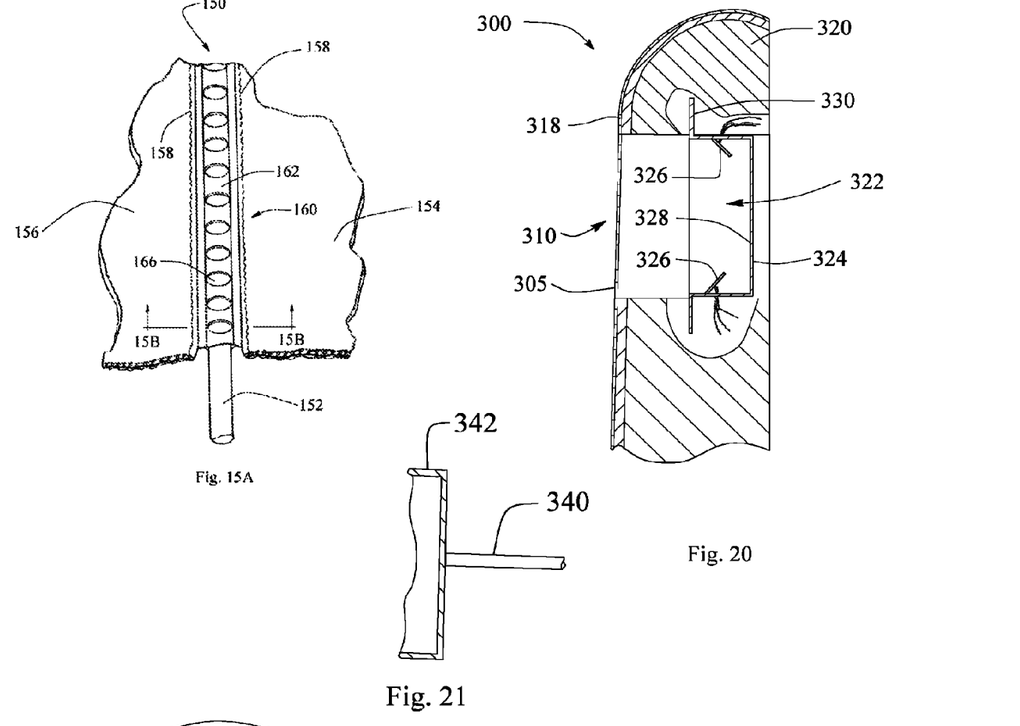
FIG. 15A is a perspective view of a portion of an illuminated seam strip in accordance with a seventh embodiment of the invention.
FIG. 20 is a side elevational view, in cross section, of the illuminated seat headrest of FIG. 19.
FIG. 21 is a side elevational view of a portion of an illuminated seat headrest in accordance with a tenth embodiment of the invention.
Figures 15B, 19:
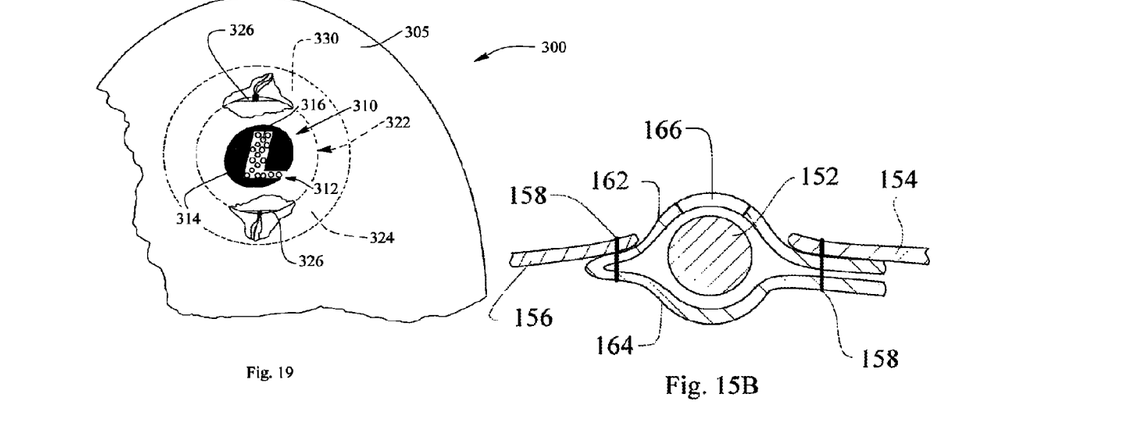
FIG. 15B is a cross sectional view taken along line 15B-15B of FIG. 15A.
FIG. 19 is a front elevational view, in partial cross section, of a portion of an illuminated seat headrest in accordance with a ninth embodiment of the invention.

Referring now to FIGS. 15A and 15B, there is illustrated an illuminated seam, indicated generally at 150, that includes a strip 152 as part of a seventh embodiment of the invention. The illuminated seam 150 may include the connection of a first trim panel section 154 to a second trim panel section 156 by a thread 158. Alternatively, the seam 150 may be formed from a single panel, if desired. The seam 150 connects a carrier 160 to the first trim panel 154 and to the second trim panel 156. The carrier 160 has a first side 162 that is observable from the vehicle cabin, and a second side 164, that is not observable from the vehicle cabin during normal and intended operation of the interior component. The first and second sides 162 and 164, respectively, of the carrier 160 may be formed from a single panel, component, or piece of material as shown in FIG. 15B. Alternatively, the carrier 160 may be formed from two or more pieces of material. The carrier 160 may be opaque, and in a preferred embodiment may be made from the same material as the first and second trim panels 154 and 156, respectively. The first side 162 of the carrier 160 has a plurality of windows 166 formed therethrough. The windows 166 are illustrated as elliptical openings. However, any shaped window 166 may be provided. The strip 152 is disposed in the carrier 160 such that a portion of the strip 152 can be seen through the windows 166. The strip 152 may be illuminated in the same manner as described above. Once illuminated, the windows 166 allow light to pass through portions of the carrier 160 from the strip 152, thus creating a segmented effect that alternates between the lighted windows 166 and the non-lighted portions of the first side 162. The seam 150 can be applied to any interior trim component such as, for example, a seat cover, a door bolster, a dashboard pad, a headliner, an interior panel, a bezel, and the like.

Figures 16, 17, 18:
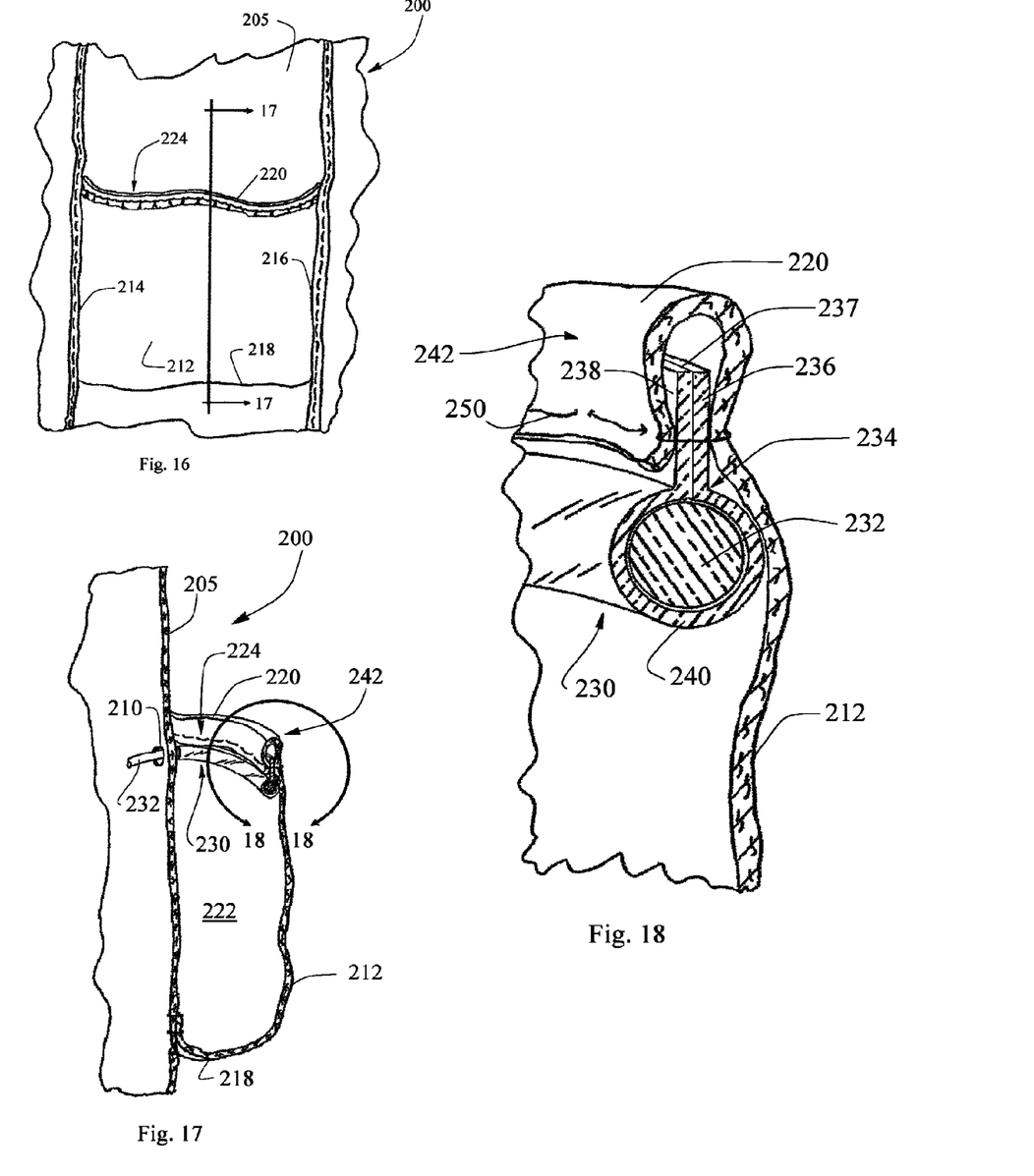
FIG. 16 is an elevational view of an illuminated pocket in accordance with an eighth embodiment of the invention.
FIG. 17 is an enlarged cross sectional view of the illuminated pocket taken along line 17-17 of FIG. 16.
FIG. 18 is a further enlarged, cross sectional view of a portion of the illuminated pocket illustrated in FIG. 17.

FIGS. 16-18 illustrate an illuminated pocket, shown generally at 200, that is a portion of an eighth embodiment of this invention. The illuminated pocket 200 may be similar to or used in place of, for example, the pocket 38 of the door panel 32 illustrated in FIG. 1. The illuminated pocket 200, however, may be applied to any interior location desired. The illuminated pocket 200 includes a back panel 205 having an aperture 210 formed therethrough and a pocket panel 212. Though described in the context of a vehicular seat, the illuminated pocket 200 may be used with any interior component such as, for example, the seat 10, the door panel 32, a center arm rest (not shown), and the like. The pocket panel 212 has opposed sides 214 and 216 and a bottom 218 that engage respective portions of the back panel 205. The pocket panel 212 may be made from several pieces of material or from a single piece of material if desired. The pocket panel 212 further includes a top edge 220 that is illustrated as not engaged with the back panel 205. Alternatively, the back panel 205 may be secured to the pocket panel 212 along the top edge 220 by a releasable fastener (not shown). As best shown in FIG. 17, the back panel 205 and the pocket panel 212 cooperate to define a pocket cavity 222 that is accessible by an opening 224 between the back panel 205 and the top edge 220.

As best illustrated in FIGS. 17 and 18, the top edge 220 includes a strip, indicated generally at 230. The strip 230 may be similar to the strips mentioned above, for example strip 52, strip 72, or strip 92 in both function and appearance, though such is not required. The strip 230 includes an optical guide 232 and a carrier 234. As best shown in FIG. 18, the carrier 234 is illustrated having a pair of opposed, extending legs 236 and 238 and a tube portion 240, though such is not required. The opposed extending legs 236 and 238 are secured together by a seam 237. The seam 237 may extend along the complete contiguous length of the opposed extending legs 236 and 238. The seam 237 may be formed during assembly of the optical guide 232 and the carrier 234 as described in relation to the die 80. During assembly, the mating portions of the opposed extending legs 236 and 238 may be heat bonded, chemically welded, ultrasonically welded, adhesively bonded, or otherwise secured together to form the seam 237. The carrier 234 can be made of a transparent or translucent material, such as a clear resin, and illuminated by the optical guide 232, which is disposed within the tube portion 240. Alternatively, the carrier 234 may be similar to the carriers 76 and 96, described above, if desired. The optical guide 232 may also be configured similar to the strip 52 described above, thus eliminating the carrier 234. The legs 236 and 238 of the carrier 234 are bonded together and cooperate to form a mounting tab that can be sewed into a hem 242 that defines the top edge 220. The hem 242 can be formed in a conventional manner by folding the material of the pocket panel 212 and engaging the legs 236 and 238 therebetween. The hem 242 and the legs 236 and 238 can be fixed together by stitching 250. Alternatively, the strip 230 may be secured to the pocket panel 212 by any other suitable attachment structure and method desired.

Referring now to FIGS. 19 and 20, an upper portion of a seat, shown generally at 300, includes a trim cover 305 having an illuminated emblem 310 formed therein. The upper portion 300 may be a headrest, similar to the headrest 16 shown in FIG. 1, though such is not required. While described in the context of the seat headrest 300, the emblem 310 may be provided on any interior component desired. The illuminated emblem 310 includes an illuminated portion 312 and may further include an embroidered portion 314, though such is not required. The illuminated portion 312 includes a plurality of perforations 316 that allow light to pass therethrough. The perforations 316 are arranged in a pattern to form the desired shape of the illuminated portion 312 of the emblem 310.

As shown in FIG. 20, the headrest 300 includes a foundation pad 318 positioned between a foam base 320 and the trim cover 305, though such a layering configuration is not required. The foam base 320 has an aperture 322 formed therein. The aperture 322 is illustrated as extending through the foundation pad 318, though such is not required. A housing 324 may be disposed within the aperture 322. The housing 324 includes at least one light source 326, which may be an LED or any other light emitting source. When the housing 324 is provided with the light source 326 contained therein, a reflective bottom 328 may be included to augment the intensity of the light emitted through the perforations 316. The housing 324 may include a mounting surface such as a flange 330 that is disposed within the foam base 320. The flange 330 is illustrated as an annular flange, though any desired shape may be used. The housing 324 may, alternatively, omit the annular flange 330 and may further be adhesively bonded to the foam base 320 within the aperture 322.

In a tenth embodiment shown in FIG. 21, an optical guide 340 may be used in the headrest 300 so that the light source 326 may be mounted in another location such as, for example, the seat back 12 or the seat bottom 14 shown in FIG. 1. The optical guide 340 may be attached to or formed integrally with a housing 342. The housing 342 and the optical guide 340 may be made from a transparent or translucent material, such as a clear resin, similar to the carrier 234 as described above. The housing 342 may be similarly shaped to the housing 324, though such is not required.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An interior component having an illuminated portion comprising:
   a trim panel;
   at least one light conductive element adapted to communicate with an illumination source; and
   a carrier engaging the trim panel, the carrier further supporting the light conductive element, wherein the carrier surrounds the light conductive element and has a plurality of windows formed therethrough such that the light conductive element is visible through the plurality of windows.

2. The interior component of claim 1 wherein the light conductive element is an optical guide.

3. The interior component of claim 1 wherein the carrier and the trim cover are formed from a single piece of material.

4. The interior component of claim 1 wherein the carrier is an opaque material that encircles the light conductive element.

5. The interior component of claim 1 wherein the vehicular interior component is a seat.

6. The interior component of claim 1 wherein the vehicular interior component is a door panel.

7. An interior component having an illuminated portion comprising:

a trim cover;

an emblem engaging the trim cover, the emblem including a body portion having a mounting stake extending therefrom that extends through the trim cover, the body portion and the mounting stake of the emblem each being formed from a transparent or translucent material; and a light source in communication with the mounting stake of the emblem.

8. The interior component of claim 7 wherein a plurality mounting stakes extends from the body portion through the trim cover, each of the plurality of mounting stakes being formed from a transparent or translucent material and communicating with the light source.

9. The interior component of claim 7 wherein the light source is a light emitting diode.

10. The interior component of claim 7 wherein the light source is an optical guide in communication with a light emitting diode and a housing.

11. The interior component of claim 7 wherein the interior component is a seat assembly.

12. The interior component of claim 7 wherein the interior component is a door panel.

13. A method of forming an interior component comprising the steps of:

(a) forming a light conductive element by (1) providing an optical guide, (2) providing a trim cover having an opening and a mounting tab, (3) assembling the optical guide within the opening of the trim cover, and (4) heat shrinking the trim cover onto the optical guide;

(b) securing the mounting surface of the light conductive element to a portion of the trim cover;

(c) engaging an illumination source to at least one portion of the light conductive element; and (d) providing a substrate and securing the trim cover thereon.

14. The method of claim 13 wherein step (a) includes the step of integrally forming the optical guide and the mounting tab.

15. The method of claim 13 wherein step (a) includes extrusion forming the mounting tab from a fluidized material in the form of a carrier that further includes an opening, and coaxially extruding the optical guide during the extrusion forming process.

16. The method of claim 13 wherein step (a) includes extruding a carrier having an opening and a mounting tab, the opening having a radial clearance fit with the optical guide.

17. The method of claim 16 wherein the interior component is a door panel having a pocket, step (c) includes providing the trim cover as a pocket panel, and step (d) includes forming a hem onto the trim cover and securing the mounting tab within the hem.

18. The method of claim 16 wherein the interior component is a seat having a pocket, step (c) includes providing the trim cover as a pocket panel, and step (d) includes forming a hem onto the trim cover and mounting the mounting tab within the hem.

* * * * *